United States Patent
Wang et al.

(10) Patent No.: US 12,361,258 B2
(45) Date of Patent: Jul. 15, 2025

(54) METHOD FOR PREDICTING AND CONTROLLING AWATER LEVEL OF A SERIES WATER CONVEYANCE CANAL ON A BASIS OF A FUZZY NEURAL NETWORK

(71) Applicants: CHINA THREE GORGES CORPORATION, Beijing (CN); CHINA INSTITUTE OF WATER RESOURCES AND HYDROPOWER RESEARCH, Beijing (CN)

(72) Inventors: Hao Wang, Beijing (CN); Xiaohui Lei, Beijing (CN); Huichao Dai, Beijing (CN); Lingzhong Kong, Beijing (CN); Zhao Zhang, Beijing (CN); Chao Wang, Beijing (CN); Heng Yang, Beijing (CN); Yongnan Zhu, Beijing (CN); Zhaohui Yang, Beijing (CN)

(73) Assignees: CHINA THREE GORGES CORPORATION (CN); CHINA INSTITUTE OF WATER RESOURCES AND HYDROPOWER RESEARCH (CN)

( * ) Notice: Subject to any disclaimer, the term of this patent is extended or adjusted under 35 U.S.C. 154(b) by 365 days.

(21) Appl. No.: 17/624,231

(22) PCT Filed: Mar. 9, 2021

(86) PCT No.: PCT/CN2021/079840
§ 371 (c)(1),
(2) Date: Dec. 30, 2021

(87) PCT Pub. No.: WO2021/196997
PCT Pub. Date: Oct. 7, 2021

(65) Prior Publication Data
US 2023/0252266 A1    Aug. 10, 2023

(30) Foreign Application Priority Data
Apr. 2, 2020 (CN) .......................... 202010255987.7

(51) Int. Cl.
  G06N 3/043   (2023.01)
  G06N 3/063   (2023.01)
  G06N 3/08    (2023.01)

(52) U.S. Cl.
  CPC .............. *G06N 3/043* (2023.01); *G06N 3/063* (2013.01); *G06N 3/08* (2013.01)

(58) Field of Classification Search
  CPC .......... G06N 3/043; G06N 3/063; G06N 3/08; G06N 3/04; G06N 3/06
  See application file for complete search history.

(56) References Cited

PUBLICATIONS

Wu, Daniel, Fakhreddine Karray, and Insop Song. "Water level control by fuzzy logic and neural networks." IEEE conference on control applications. 2005. (Year: 2005).*

(Continued)

*Primary Examiner* — Kamran Afshar
*Assistant Examiner* — Brian J Hales (57) ABSTRACT

A method for predicting and controlling a water level of a series water conveyance canal on the basis of a fuzzy neural network is disclosed. The method includes: performing the relationship between a sluice opening degree and an open canal control water level by means of a fuzzy neural network, and constructing an upstream water level controller of a coupled predictive control algorithm; solving an optimal control rate of the upstream water level controller using a gradient optimization algorithm on the basis of a control target of the upstream water level controller; and generating a control strategy by collecting actually measured water level change information and multiplying the actually measured water level change information by the optimal control (Continued)

rate on the basis of the solved optimal control rate, thereby fulfilling the object of predicting and controlling the water level.

5 Claims, 5 Drawing Sheets

(56) References Cited

PUBLICATIONS

Alvisi, S., et al. "Water level forecasting through fuzzy logic and artificial neural network approaches." Hydrology and Earth System Sciences 10.1 (2006): 1-17. (Year: 2006).*

Binoy, C. Nikhil, et al. "Flood Prediction Using Flow and Depth Measurement with Artificial Neural Network in Canals." 2019 3rd International Conference on Computing Methodologies and Communication (ICCMC). IEEE, 2019. (Year: 2019).*

* cited by examiner

METHOD FOR PREDICTING AND CONTROLLING AWATER LEVEL OF A SERIES WATER CONVEYANCE CANAL ON A BASIS OF A FUZZY NEURAL NETWORK

FIELD

The present invention relates to the technical field of real time control of the water level of canal, in particular to a method for predicting and controlling a water level of a series water conveyance canal on the basis of a fuzzy neural network.

BACKGROUND

The control target of canal water conveyance is to provide users with safe and reliable water supply services. However, the stability of water conveyance is controlled by the water level at some points. These points are commonly referred to as control points of canal operation, and maintaining the water level stability at the control points is the primary condition for the safe operation of the canal. The water level control is mainly accomplished by the control buildings in the middle and entrance of the canal pool. The water level control of the canal pool mainly depends on the real-time water level information. In the traditional sense, the canal operation control basically depends on manual operation, and the control process completely depends on the operation experience of sluice operators. There are many obvious drawbacks in this operation mode. There are many subjective factors in the regulation and control process of the regulating sluice, and it is difficult to accurately control the water volume, which can easily lead to abandoned water or insufficient water supply.

Therefore, at present, the open canal water conveyance project is developing towards realizing unattended and automatic operation. The basis of open canal automatic control is open canal control algorithm and open canal control model. In the aspect of open canal control algorithms, there are currently classic PI control algorithm, as well as advanced optimal control algorithm, predictive control algorithm, and robust control algorithm. In the aspect of open canal control models, which mainly comprises a linearized Saint-Venant equations control model and a simplified linear control model. The advantage and disadvantage of the control models and the control algorithms directly affect the control level of the control system. In the aspect of control algorithms, predictive control algorithm has been proved that its control theory and its control performance in practical engineering are much higher than other control algorithms. In the aspect of the research of open canal control, the dominating factor for restricting the control effect of open canal control system lies in the accuracy of control models. The control models are required to reflect the relationship between the control input of the research object and the control target, and they also require a certain degree of fast calculation. The open canal simulation equation, Saint-Venant equations has been proved to be able to well simulate the changing trend of water level and water flow in the canal pool, therefore, this equation can be used to deduce the relationship between water level and water flow in the canal pool. However, due to the nonlinear and differential characteristics of the Saint-Venant equations, there will be a huge number of calculation problems during the process of solving and applying the control algorithms, so this equation cannot be directly used as the control model. Regarding the differential characteristic of Saint-Venant equations, linearization processing is mainly used at present, but even the control model obtained by linearizing Saint-Venant equations has complicated equations. At present, the research mainly focuses on the construction of the control model of a single canal pool, which can not be applied to the actual multi-series canal pool project. The simplified linear control model is the most commonly used control model at present. It assumes that the water level and water flow of a single canal pool keep a linear relationship, and it is a steady relationship. The equation describing this relationship is an integral time-delay model. A control model describing the relationship between the control water level target and the control water flow change value of multi-canal pool can be constructed by processing the integral time-delay model in detail. However, there are a series of problems in the utilization of this simplified linear control model. First, it is difficult to determine the parameters of the steady linear relationship between the canal pool and the water level and water flow of the integral time-delay model; second, the integral time-delay model is too simplified, which assumes that there is a steady linear relationship between the canal pool and the water level and water flow, and this basic assumption is not valid when the water conveyance working condition of the canal pool changes greatly; third, the control action quantity here is the sluice water flow, and it is necessary to further convert the sluice water flow into the sluice opening degree. These problems limit the practicability of the simplified linear control model.

Therefore, it is urgent to find a method for predicting and controlling a water level to solve the above technical problems.

SUMMARY

The present invention is intended to provide a method for predicting and controlling a water level of a series water conveyance canal on the basis of a fuzzy neural network, so as to solve the aforementioned problems existing in the prior art.

In order to achieve the foregoing objectives, the following technical solutions are used in the present invention:

a method for predicting and controlling a water level of a series water conveyance canal on the basis of a fuzzy neural network, comprises the following steps:

S1, establishing a multi-input single-output fuzzy neural network, and training the fuzzy neural network on the basis of operation data of the canal, so as to obtain a fuzzy neural network prediction model that can perform prediction on the water level of a canal pool on the basis of a sluice opening degree value and an initial water level;

S2, constructing an upstream water level controller of a coupled predictive control algorithm on the basis of the fuzzy neural network prediction model in step S1;

S3, solving an optimal control rate of the upstream water level controller using a gradient optimization algorithm, on the basis of a control target of the upstream water level controller constructed in step S2; and S4, generating a control strategy by collecting actually measured water level change information and multiplying the actually measured water level change information by the optimal control rate on the basis of the optimal control rate solved in step S3.

Preferably, the multi-input single-output fuzzy neural network established in step S1 specifically comprises four layers, wherein:

a first layer is an input layer, which is provided with k neurons and represents the number of dimensions of input variables, and the formula of the input layer is as follows $$x_i = u_i \quad (1)$$

wherein i=1, 2, ..., k, ui is the ith input value, and x=[x1, x2, ..., xk] is an output vector;

a second layer is a radial basis layer, which is provided with p neurons to blur the input and an output of the layer is the product of a membership function, and an output of the neurons is shown in formula (2):

$$\phi_j = \prod_{i=1}^{k} e^{-\frac{(x_i - c_{ij})^2}{2 \times \sigma_{ij}^2}} = e^{-\sum_{i=1}^{k} \frac{(x_i - c_{ij})^2}{2 \times \sigma_{ij}^2}}, \quad (2)$$

wherein j=1, 2, ..., p, x=[x1, x2, ..., xk] is an input of the fuzzy neural network layer; CJ=[C1j, C2j, ..., CKj], σj=[σ1j, σ2j, ..., σKj] are a center vector and width vector of the jth neuron respectively, ɸj is an output value of the jth neuron and P is the number of neurons in the layer;

a third layer is a regular layer, which also provides with p neurons, and an output form thereof is shown in formula (3):

$$v_l = \frac{\varphi_l}{\sum_{j=1}^{P} \varphi_j} = \frac{e^{-\sum_{i=1}^{k} \frac{(x_i(t) - c_{ij}(t))^2}{2 \times \sigma_{ij}^2}}}{\sum_{j=1}^{P} e^{-\sum_{i=1}^{k} \frac{(x_i(t) - c_{ij}(t))^2}{2 \times \sigma_{ij}^2(t)}}}, \quad (3)$$

wherein l=1, 2, ..., p, v1 is the first output, and v=[v1, v2, ..., VP]T is the output vector;

and a fourth layer is the output layer, and a fitting method of the output layer uses a weighting factor method, and the calculation formula is shown in formula (4):

$$y = wv = \frac{\sum_{l=1}^{P} w_l(t) e^{-\sum_{i=1}^{k} \frac{(x_i(t) - c_{ij}(t))^2}{2 \times \sigma_{ij}^2}}}{\sum_{j=1}^{P} e^{-\sum_{i=1}^{k} \frac{(x_i(t) - c_{ij}(t))^2}{2 \times \sigma_{ij}^2(t)}}}, \quad (4)$$

wherein w=[W1, W2, ..., WP]$^T$ is an output weight vector, and v is the output vector of the regular layer.

Preferably, input layer variables of the neural network prediction model constructed in step S1 are shown in formula (5):

$$x(t) = [y(t-1), \ldots, y(t-n_y), u(t-1-t_d), \ldots, u(t-n_u-t_d)]^T \quad (5)$$

output layer variables are shown in formula (6), $$y(t) = [y(t+1), y(t+2), \ldots, y(t+H_p)]^T \quad (6)$$

Preferably, an objective function of the upstream water level controller constructed in step S2 is shown in formula (7):

$$J(t) = \sum_{i=1}^{H_p} (y(t+i) - \hat{y}(t+i))^T W_i^y (y(t+i) - \hat{y}(t+i)) + \quad (7)$$

-continued $$\sum_{j=1}^{H_u} \Delta u(t+j-1)^T W_j^u \Delta u(t+j-1).$$

$$\Delta u(t) = u(t+1) - u(t),$$

$$|\Delta u(t)| \leq \Delta u_{max},$$

wherein $y_{min} \leq y(t) \leq y_{max}$, $H_u$ is a control duration, which meets $H_u \leq H_p$; an object y(t+i) is a predicted output variable, that is, a predicted upstream water level; ŷ(t) is a target value of the output variable, that is, an upstream target water level; u(t) is a sluice opening degree; Δu(t) is a control variable, which is the increment of u(t), that is, the change of the sluice opening degree; and $W_i^y$ and $W_j^u$ are a weighting coefficient of the i-step output variable and the j-step control variable, respectively.

Preferably, the process of the gradient optimization in step S3 comprises the following steps:

S31, minimizing the objective function of the upstream water level controller, as shown in Formula 8:

$$\hat{J}(u(t)) = \rho_1 (r(t) - \hat{r}(t))^T (r(t) - \hat{r}(t)) + \rho_2 \Delta u(t)^T \Delta u(t), \quad (8)$$

wherein, $$r(t) = y(t) = [y(t+1), y(t+2), \ldots, y(t+H_p)]^T,$$

$$\hat{r}(t) = [\hat{y}(t+1), \hat{y}(t+2), \ldots, \hat{y}(t+H_p)]^T,$$

$$\Delta u(t) = [u(t), u(t+1), \ldots, u(t+H_u-1)]^T,$$

$$\rho_1 = \begin{bmatrix} W_1^y & & & & & \\ & W_2^y & & & & \\ & & \ldots & & & \\ & & & W_i^y & & \\ & & & & \ldots & \\ & & & & & W_{H_p}^y \end{bmatrix},$$

$$\rho_2 = \begin{bmatrix} W_1^u & & & & & \\ & W_2^u & & & & \\ & & \ldots & & & \\ & & & W_j^u & & \\ & & & & \ldots & \\ & & & & & W_{H_u}^u \end{bmatrix}.$$

S32, according to a gradient algorithm theory, calculating the optimal control rate of the upstream water level controller is calculated using formula (9):

$$u(t+1) = u(t) + \Delta u(t) = u(t) + \eta_2 \left( -\frac{\partial J(u(t))}{\partial u(t)} \right), \quad (9)$$

wherein η2 is a learning rate of the control input and calculate a partial derivative of the objective function J(u(t)) with respect to u(t), so as to obtain $$\frac{\partial \hat{J}(u(t))}{\partial u(t)} = -\rho_1 \left( \frac{\partial \hat{y}(t)}{\partial u(t)} \right)^T (r(t) - \hat{y}(t)) + \rho_2 \Delta u(t), \quad (10)$$

and therefore,

-continued $$\Delta u(t) = \frac{\eta_2 \rho_1 \left(\frac{\partial \hat{y}(t)}{\partial u(t)}\right)^T (r(t) - \hat{y}(t))}{1 + \eta_2 \rho_2}, \quad (11)$$

wherein $\partial \hat{y}(t)/\partial u(t)$ is a Jacobian matrix, which is calculated by the fuzzy neural network model.

The present invention has the following beneficial effects:

The present invention discloses a method for predicting and controlling a water level of the series water conveyance canal on the basis of a fuzzy neural network, the method, performing the relationship between a sluice opening degree and an open canal control water level by means of a fuzzy neural network, and constructing an upstream water level controller of a coupled predictive control algorithm; solving an optimal control rate of the upstream water level controller using a gradient optimization algorithm on the basis of a control target of the upstream water level controller; and generating a control strategy by collecting actually measured water level change information and multiplying the actually measured water level change information by the optimal control rate on the basis of the solved optimal control rate, thereby fulfilling the object of accurate predicting and controlling the water level.

DETAILED DESCRIPTION

To make the purpose, technical solutions and advantages of the present invention more apparent, the present invention is further illustrated below in conjunction with appended drawing. It is understood that the particular embodiments described herein is only intended to explain the present invention, and is not taken to limit the present invention.

Embodiments

Figure 9:
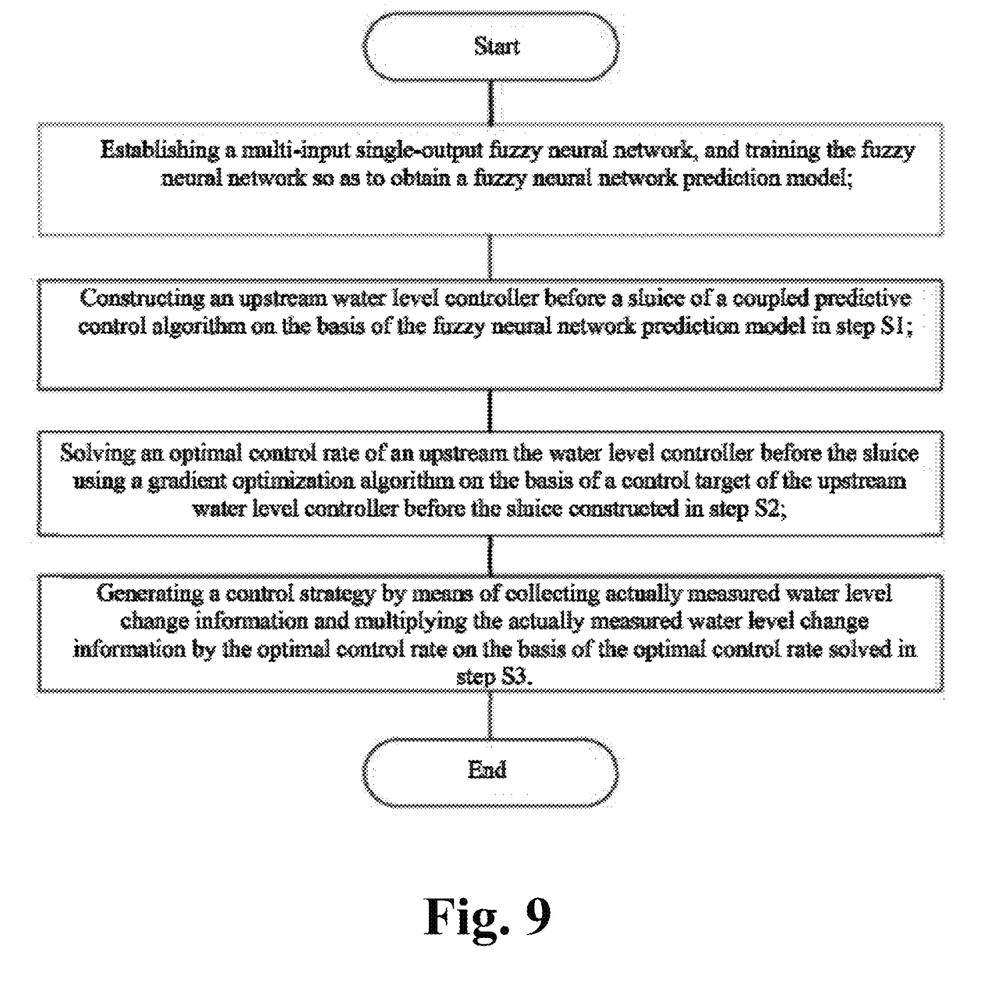
FIG. 9 is a flow chart of the method for predicting and controlling the water level of a series water conveyance canal on the basis of a fuzzy neural network in the present invention.

This embodiment provides a method for predicting and controlling a water level of a series water conveyance canal on the basis of a fuzzy neural network, as shown in FIG. 9, comprising the following steps:

S1, establishing a multi-input single-output fuzzy neural network, and training the fuzzy neural network on the basis of operation data of the canal, so as to obtain a fuzzy neural network prediction model that can perform prediction on the water level of a canal pool on the basis of a sluice opening degree value and an initial water level;

S2, constructing an upstream water level controller of a coupled predictive control algorithm on the basis of the fuzzy neural network prediction model in step S1;

S3, solving an optimal control rate of the upstream water level controller using a gradient optimization algorithm, on the basis of a control target of the upstream water level controller constructed in step S2; and S4, generating a control strategy by collecting actually measured water level change information and multiplying the actually measured water level change information by the optimal control rate on the basis of the optimal control rate solved in step S3.

In this embodiment, the multi-input single-output fuzzy neural network established in step S1 specifically comprises four layers, wherein:

a first layer is an input layer, which is provided with k neurons and represents the number of dimensions of input variables, and the formula of the input layer is as follows $$x_i = u_i \quad (1)$$

wherein i=1, 2, . . . , k, ui is the ith input value, and x=[x1, x2, . . . , xk] is an output vector;

a second layer is a radial basis layer, which is provided with p neurons to blur the input and an output of the layer is the product of a membership function, and an output of the neurons is shown in formula (2):

$$\phi_j = \prod_{i=1}^{k} e^{-\frac{(x_i - c_{ij})^2}{2 \times \sigma_{ij}^2}} = e^{-\sum_{i=1}^{k} \frac{(x_i - c_{ij})^2}{2 \times \sigma_{ij}^2}}, \quad (2)$$

wherein j=1, 2, . . . , p, x=[x1, x2, . . . , xk] is an input of the fuzzy neural network layer; CJ=[C1j, C2j, . . . , CKj], σj=[σ1j, σ2j, . . . , σKj] are a center vector and width vector of the jth neuron respectively, φj is an output value of the jth neuron and P is the number of neurons in the layer;

a third layer is a regular layer, which also provides with p neurons, and an output form thereof is shown in formula (3):

$$v_l = \frac{\varphi_l}{\sum_{j=1}^{P} \varphi_j} = \frac{e^{-\sum_{i=1}^{k} \frac{(x_i(t) - c_{ij}(t))^2}{2 \times \sigma_{ij}^2}}}{\sum_{j=1}^{P} e^{-\sum_{i=1}^{k} \frac{(x_i(t) - c_{ij}(t))^2}{2 \times \sigma_{ij}^2(t)}}}, \quad (3)$$

wherein l=1, 2, . . . , p, v1 is the first output, and v=[v1, v2, . . . , VP]T is the output vector;

and a fourth layer is the output layer, and a fitting method of the output layer uses a weighting factor method, and the calculation formula is shown in formula (4):

$$y = wv = \frac{\sum_{l=1}^{P} w_l(t) e^{-\sum_{i=1}^{k} \frac{(x_i(t)-c_{ij}(t))^2}{2\times\sigma_{ij}^2}}}{\sum_{j=1}^{P} e^{-\sum_{i=1}^{k} \frac{(x_i(t)-c_{ij}(t))^2}{2\times\sigma_{ij}^2(t)}}}, \quad (4)$$

wherein $w=[W1, W2, \ldots, WP]^T$ is an output weight vector, and v is the output vector of the regular layer.

Preferably, input layer variables of the neural network prediction model constructed in step S1 are shown in formula (5):

$$x(t)=[y(t-1), \ldots, y(t-n_y), u(t-1-t_d), \ldots, u(t-n_u-t_d)]^T \quad (5);$$

output layer variables are shown in formula (6), $$y(t)=[y(t+1), y(t+2), \ldots, y(t+H_p)]^T \quad (6).$$

In this embodiment, an objective function of the upstream water level controller constructed in step S2 is shown in formula (7):

$$J(t) = \sum_{i=1}^{H_p} (y(t+i) - \hat{y}(t+i))^T W_i^y (y(t+i) - \hat{y}(t+i)) + \quad (7)$$

$$\sum_{j=1}^{H_u} \Delta u(t+j-1)^T W_j^u \Delta u(t+j-1),$$

$$\Delta u(t) = u(t+1) - u(t),$$

$$|\Delta u(t)| \leq \Delta u_{max},$$

wherein $$y_{min} \leq y(t) \leq y_{max},$$

$H_u$ is a control duration, which meets $H_u \leq H_p$; an object $y(t+i)$ is a predicted output variable, that is, a predicted upstream water level; $\hat{y}(t)$ is a target value of the output variable, that is, an upstream target water level; $u(t)$ is a sluice opening degree; $\Delta u(t)$ is a control variable, which is the increment of $u(t)$, that is, the change of the sluice opening degree; and $W_i^y$ and $W_j^u$ are a weighting coefficient of the i-step output variable and the j-step control variable, respectively.

In this embodiment, the process of the gradient optimization in step S3 comprises the following steps:

S31, minimizing the objective function of the upstream water level controller, as shown in Formula 8:

$$\hat{J}(u(t)) = \rho_1 (r(t) - \hat{r}(t))^T (r(t) - \hat{r}(t)) + \rho_2 \Delta u(t)^T \Delta u(t), \quad (8)$$

wherein, $$r(t) = y(t) = [y(t+1), y(t+2), \ldots, y(t+H_p)]^T,$$

$$\hat{r}(t) = [\hat{y}(t+1), \hat{y}(t+2), \ldots, \hat{y}(t+H_p)]^T,$$

$$\Delta u(t) = [u(t), u(t+1), \ldots, u(t+H_u-1)]^T,$$

$$\rho_1 = \begin{bmatrix} W_1^y & & & & & \\ & W_2^y & & & & \\ & & \ddots & & & \\ & & & W_i^y & & \\ & & & & \ddots & \\ & & & & & W_{H_p}^y \end{bmatrix},$$

$$\rho_2 = \begin{bmatrix} W_1^u & & & & & \\ & W_2^u & & & & \\ & & \ddots & & & \\ & & & W_j^u & & \\ & & & & \ddots & \\ & & & & & W_{H_u}^u \end{bmatrix}.$$

S32, according to a gradient algorithm theory, calculating the optimal control rate of the upstream water level controller is calculated using formula (9):

$$u(t+1) = u(t) + \Delta u(t) = u(t) + \eta_2 \left( -\frac{\partial J(u(t))}{\partial u(t)} \right), \quad (9)$$

wherein $\eta_2$ is a learning rate of the control input and calculate a partial derivative of the objective function $J(u(t))$ with respect to $u(t)$, so as to obtain $$\frac{\partial \hat{J}(u(t))}{\partial u(t)} = -\rho_1 \left( \frac{\partial \hat{y}(t)}{\partial u(t)} \right)^T (r(t) - \hat{y}(t)) + \rho_2 \Delta u(t), \quad (10)$$

and therefore, $$\Delta u(t) = \frac{\eta_2 \rho_1 \left( \frac{\partial \hat{y}(t)}{\partial u(t)} \right)^T (r(t) - \hat{y}(t))}{1 + \eta_2 \rho_2}, \quad (11)$$

wherein $\partial \hat{y}/\partial u(t)$ is a Jacobian matrix, which is calculated by the fuzzy neural network model.

In one embodiment, taking a certain 11-stage series canal pool as an example, the upstream water level of downstream regulating sluices of each canal pool is ensured to be stable by means of controlling the opening degree of the regulating sluice, that is, the control target is the upstream water level of 11 regulating sluices. It is assumed that the upstream water flow changes greatly, and an initial water level is much lower than the target upstream water level. The target upstream water level of 11 regulating sluices are 73.8 m, 72.6 m, 71.8 m, 70.5 m, 69.4 m, 68.3 m, 65.9 m, 65.4 m, 64.4 m, 63.2 m and 62.2 m respectively. The control strategy is selected to control once every 2 hours to ensure that the target water level is within 0.3 m above and below the target water level. Using the method in embodiment 1, the sluice is regulated and controlled to achieve the goal of regulation and control. Because the method is a real-time sluice control algorithm, in this embodiment, a one-dimensional hydrodynamic model is established instead of the actual project for performing algorithm demonstration.

Step 1: establishing a simulation model of the embodiment; generating different upstream water level change processes by means of changing the sluice opening degree in the simulation model; saving this sluice opening degree and upstream water level data; and establishing a neural network with four layers of a forward topology connection form, and wherein the input layer variables and output layer variables of the neural network respectively are:

$$x(t)=[y(t-1), \ldots, y(t-n_y), u(t-1-t_d), \ldots, u(t-n_u-t_d)]^T$$

$$y(t)=[y(t+1), y(t+2), \ldots, y(t+H_p)]^T$$

this neural network is trained with the aforementioned data.

Step 2: establishing an upstream water level prediction controller on the basis of this neural network, and the objective of the controller is:

$$J(t) = \sum_{i=1}^{H_p}(r(t+i) - \hat{y}(t+i))^T W_i^y (r(t+i) - \hat{y}(t+i)) + \sum_{j=1}^{H_u} \Delta u(t+j-1)^T W_j^u \Delta u(t+j-1)$$

the limiting condition is as follows:

$\Delta u(t) = u(t+1) - u(t)$, $|\Delta u(t)| \leq \Delta u_{max}$, $\hat{y}_{min} \leq \hat{y}(t) \leq \hat{y}_{max}$, wherein, $H_u$ is a control duration, which meets $H_u \leq H_p$; an object y(t+i) is a predicted output variable, that is, a predicted upstream water level; ŷ(t) is a target value of the output variable, that is, an upstream target water level; u(t) is a sluice opening degree; Δu(t) is a control variable, which is the increment of u(t), that is, the change of the sluice opening degree. $W_i^y$ and $W_j^u$ are a weighting coefficient of the output variable and the control variable, respectively.

Step 3: optimizing the control rate of this controller by using a Gradient algorithm, and minimizing the objective function of the upstream water level controller, as shown in Formula 8:

$$\hat{J}(u(t)) = \rho_1 (r(t) - \hat{r}(t))^T (r(t) - \hat{r}(t)) + \rho_2 \Delta u(t)^T \Delta u(t), \quad (8)$$

wherein, $r(t) = y(t) = [y(t+1), y(t+2), \ldots, y(t+H_p)]^T$, $\hat{r}(t) = [\hat{y}(t+1), \hat{y}(t+2), \ldots, \hat{y}(t+H_p)]^T$, $\Delta u(t) = [u(t), u(t+1), \ldots, u(t+H_u-1)]^T$, $$\rho_1 = \begin{bmatrix} W_1^y & & & & \\ & W_2^y & & & \\ & & \ldots & & \\ & & & W_i^y & \\ & & & & \ldots \\ & & & & & W_{H_p}^y \end{bmatrix},$$

$$\rho_2 = \begin{bmatrix} W_1^u & & & & \\ & W_2^u & & & \\ & & \ldots & & \\ & & & W_j^u & \\ & & & & \ldots \\ & & & & & W_{H_u}^u \end{bmatrix}.$$

According to a gradient algorithm theory, calculating the optimal control rate of the upstream water level controller is calculated using formula (9):

$$u(t+1) = u(t) + \Delta u(t) = u(t) + \eta_2 \left( -\frac{\partial J(u(t))}{\partial u(t)} \right), \quad (9)$$

wherein η2 is a learning rate of the control input and calculate a partial derivative of the objective function J(u(t)) with respect to u(t), so as to obtain $$\frac{\partial \hat{J}(u(t))}{\partial u(t)} = -\rho_1 \left( \frac{\partial \hat{y}(t)}{\partial u(t)} \right)^T (r(t) - \hat{y}(t)) + \rho_2 \Delta u(t), \quad (10)$$

and therefore, $$\Delta u(t) = \frac{\eta_2 \rho_1 \left( \frac{\partial \hat{y}(t)}{\partial u(t)} \right)^T (r(t) - \hat{y}(t))}{1 + \eta_2 \rho_2}, \quad (11)$$

wherein ∂ŷ(t)/∂u(t) is a Jacobian matrix, which is calculated by the fuzzy neural network model.

Figure 1:
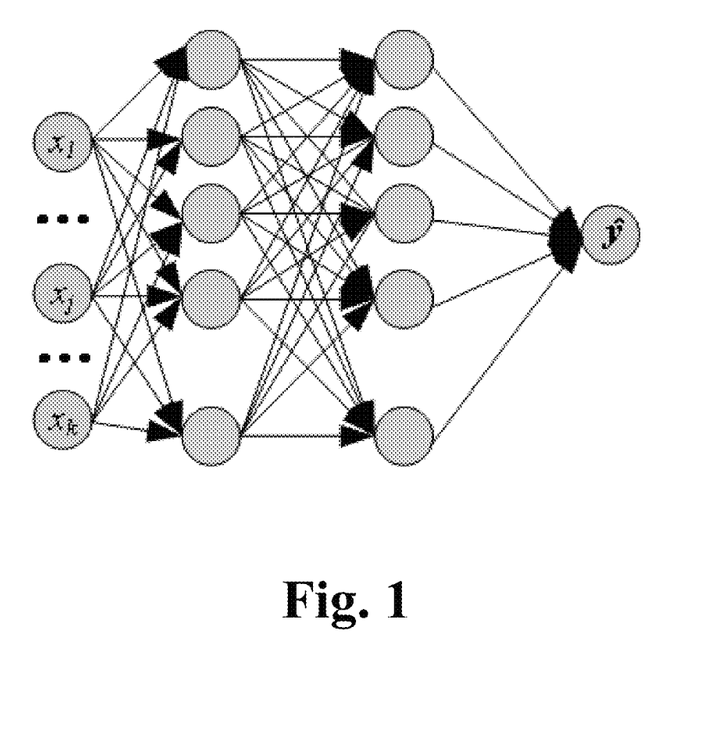
FIG. 1 is a structural diagram of a fuzzy neural network used in embodiment 1.
Figure 2:
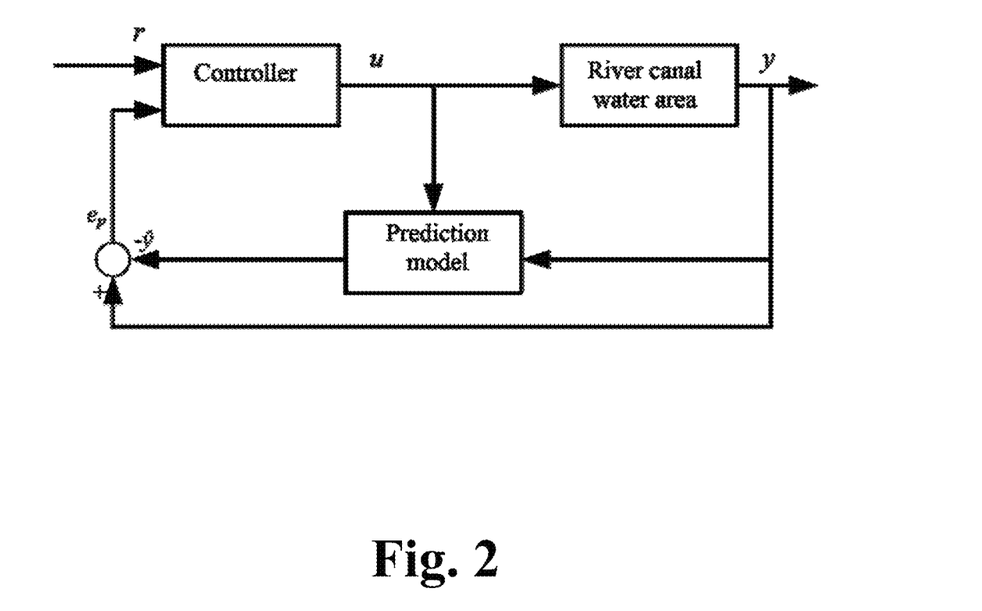
FIG. 2 is a schematic diagram of a sluice water level control scheme based on the fuzzy neural network in FIG. 1 in embodiment 1.
Figure 3:
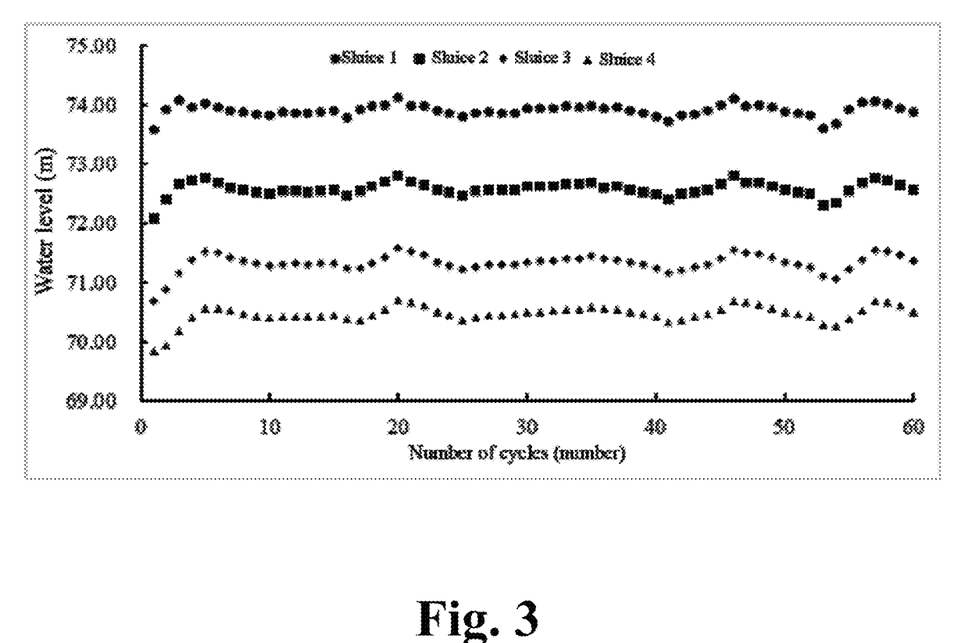
FIG. 3 is a schematic diagram of the change of an upstream water level of sluice position 1-sluice 4 simulated by using simulation model in the particular embodiments.
Figure 4:
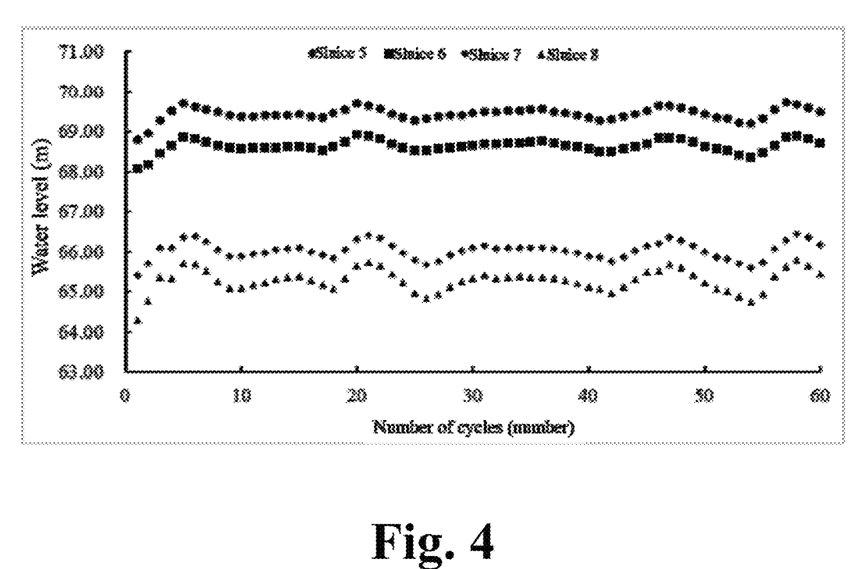
FIG. 4 is a schematic diagram of the change of an upstream water level of sluice position 5-sluice 8 simulated by using simulation model in the particular embodiments.
Figure 5:
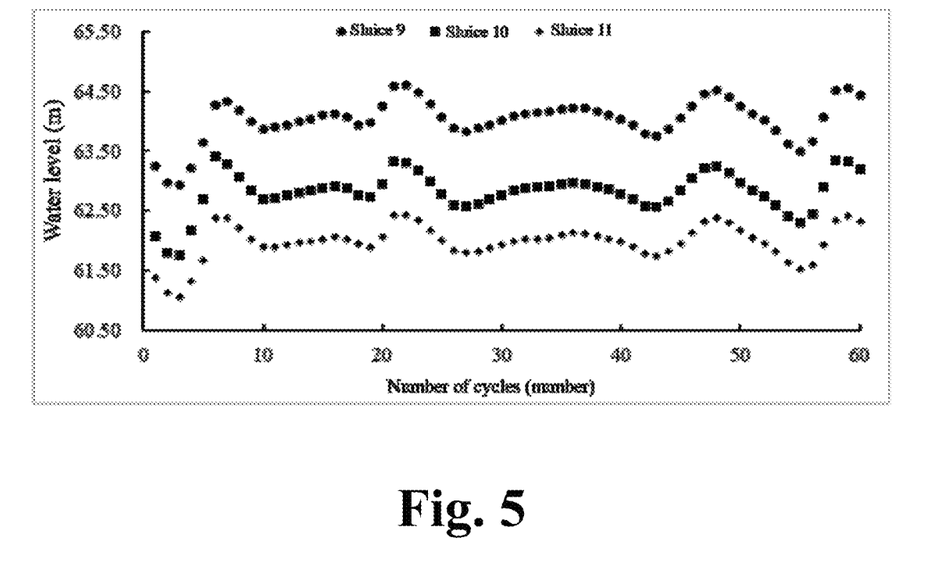
FIG. 5 is a schematic diagram of the change of an upstream water level of sluice position 9-sluice 11 simulated by using simulation model in the particular embodiments.
Figure 6:
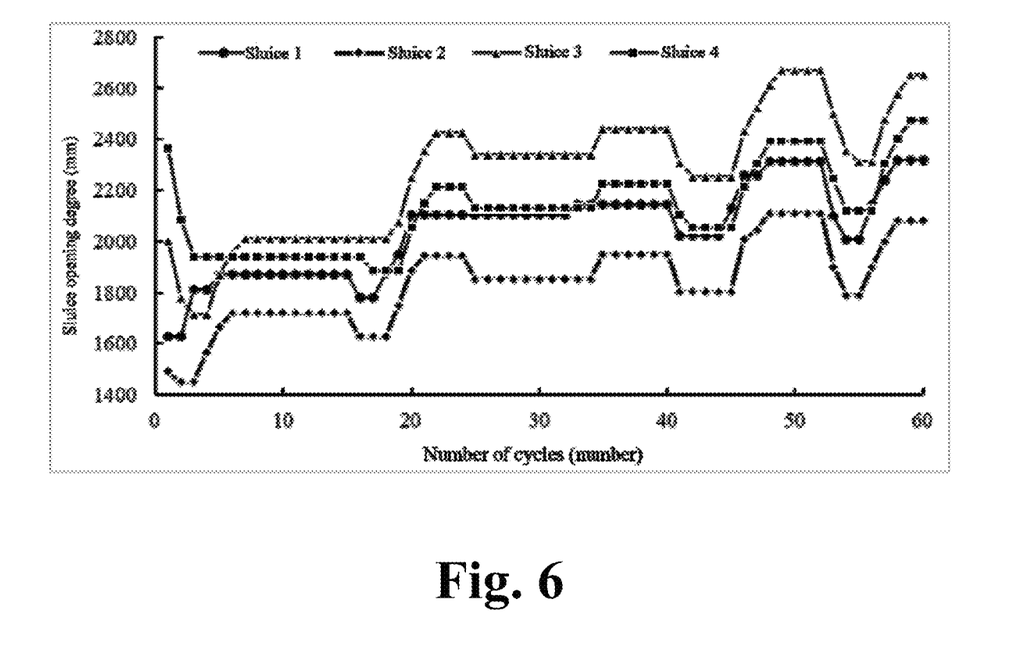
FIG. 6 is a schematic diagram of the change of a sluice opening degree of sluice position 1-sluice 4 simulated by using simulation model in the particular embodiments.
Figure 7:
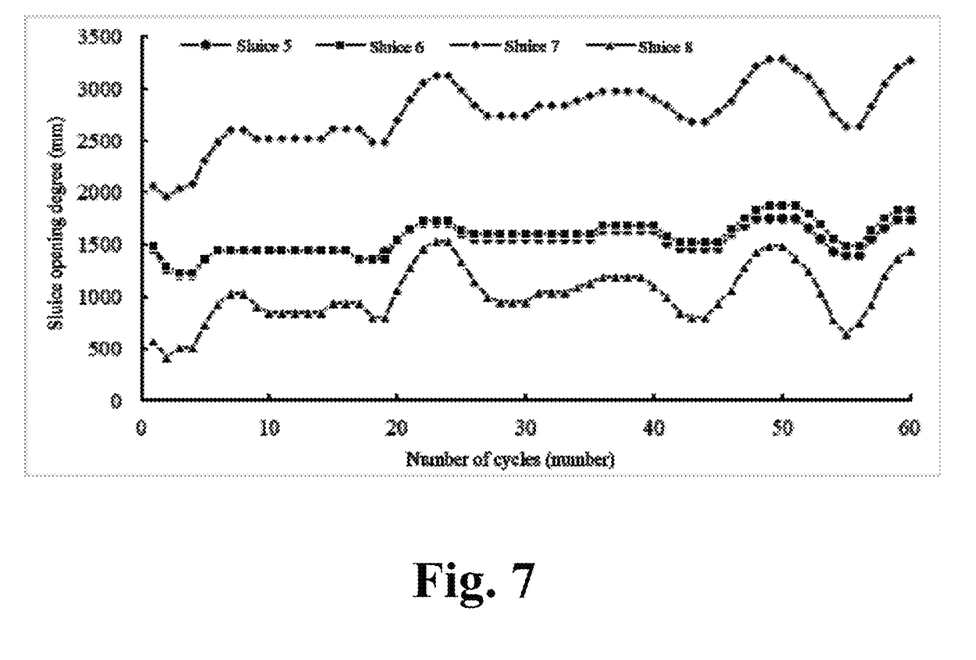
FIG. 7 is a schematic diagram of the change of a sluice opening degree of sluice position 5-sluice 8 simulated by using simulation model in the particular embodiments.
Figure 8:
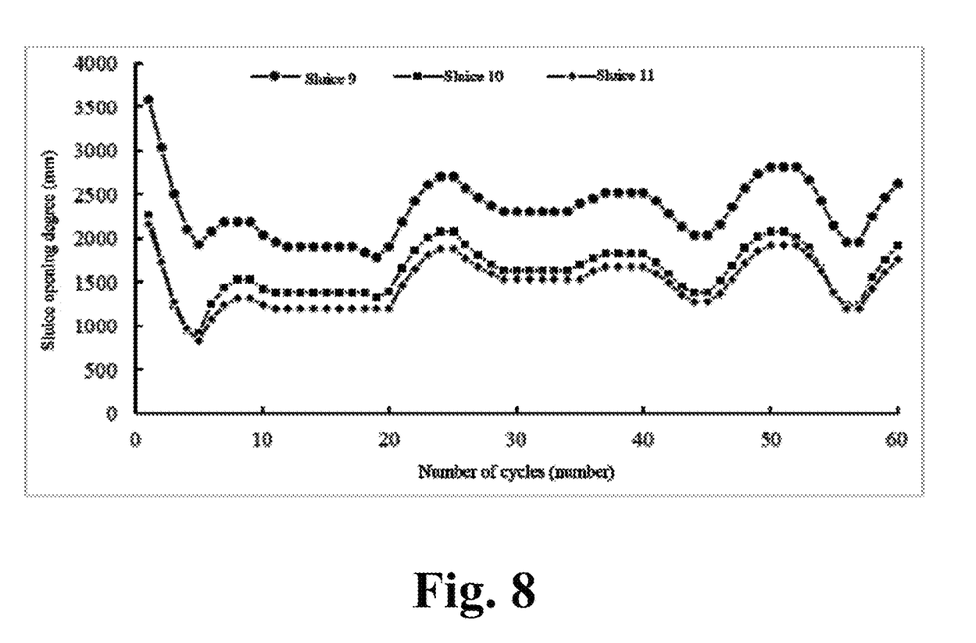
FIG. 8 is a schematic diagram of the change of a sluice opening degree of sluice position 9-sluice 11 simulated by using simulation model in the particular embodiments.

The obtained optimal control rate is applied to the simulation model canal, and the disturbance that the upstream water flow gradually increases by 20 m3/s is imposed in the simulation model, and this control rate is used for sluice regulation and control. With 2 h as step size, the result of simulating the upstream water level after adopting the simulation model is shown in FIGS. 3-5, and the sluice opening degree is shown in FIGS. 6-8.

By adopting the above-mentioned technical solutions disclosed by the present invention, the following beneficial effects are obtained:

The present invention discloses a method for predicting and controlling a water level of the series water conveyance canal on the basis of a fuzzy neural network, the method, performing the relationship between a sluice opening degree and an open canal control water level by means of a fuzzy neural network, and constructing an upstream water level controller of a coupled predictive control algorithm; solving an optimal control rate of the upstream water level controller using a gradient optimization algorithm on the basis of a control target of the upstream water level controller; and generating a control strategy by collecting actually measured water level change information and multiplying the actually measured water level change information by the optimal control rate on the basis of the solved optimal control rate, thereby fulfilling the object of predicting and controlling the water level.

The above description is only a preferred implementation of the present invention, and it should be noted that persons of ordinary skill in the art may also make several improvements and refinements without departing from the principle of the present invention, and it should not be considered that these improvements and refinements shall fall within the protection scope of the present invention.

What is claimed is:

1. A method for predicting and controlling a water level of a series water conveyance canal on a basis of a fuzzy neural network, comprising the following steps:

S1, generating a one-dimensional hydrodynamic model, generating different upstream water level change processes by changing sluice opening degree in the one-dimensional hydrodynamic model, saving the sluice opening degree and upstream water level data, establishing a multi-input single-output fuzzy neural network with four layers of a forward topology connection form, and training the multi-input single-output fuzzy neural network based on operation data of the series water conveyance canal and the sluice opening degree and the upstream water level data, so as to obtain a fuzzy neural network prediction model that can perform prediction on the water level of a canal pool based on a sluice opening degree value and an initial water level;

S2, constructing an upstream water level controller of a coupled predictive control algorithm based on the fuzzy neural network prediction model in step S1;

S3, solving an optimal control rate of the upstream water level controller using a gradient optimization algorithm based on a control target of the upstream water level controller constructed in step S2; and S4, generating a control strategy by collecting actually measured water level change information and multiplying the actually measured water level change information by the optimal control rate, based on the optimal control rate solved in step S3, and controlling the water level of the series water conveyance canal based on the control strategy.

2. The method for predicting and controlling a water level of a series water conveyance canal on the basis of a fuzzy neural network according to claim 1, the multi-input single-output fuzzy neural network established in step S1 specifically comprises four layers, wherein:

a first layer is an input layer, which is provided with k neurons and represents a number of dimensions of input variables, and a formula of the input layer is $$x_i = u_i \quad (1)$$

wherein $i=1, 2, \ldots, k$, $u_i$ is ith input value, and $x=[x_1, x_2, \ldots, x_k]$ is an output vector;

a second layer is a radial basis layer, which is provided with p neurons to blur an input and an output of the radial basis layer is a product of a membership function, and an output of the p neurons is shown in formula (2):

$$\phi_j = \prod_{i=1}^{k} e^{-\frac{(x_i - c_{ij})^2}{2 \times \sigma_{ij}^2}} = e^{-\sum_{i=1}^{k} \frac{(x_i - c_{ij})^2}{2 \times \sigma_{ij}^2}}, \quad (2)$$

wherein $j=1, 2, \ldots, p$, $x=[x_1, x_2, \ldots, x_k]$ is an input of the fuzzy neural network layer; $CJ=[C_{1j}, C_{2j}, \ldots, C_{Kj}]$, $\sigma j=[\sigma_{1j}, \sigma_{2j}, \ldots, \sigma_{Kj}]$ are a center vector and width vector of jth neuron respectively, $\phi j$ is an output value of the jth neuron and P is a number of neurons in the radial basis layer;

a third layer is a regular layer, which also provides with p neurons, and an output form thereof is shown in formula (3):

$$v_l = \frac{\varphi_l}{\sum_{j=1}^{P} \varphi_j} = \frac{e^{-\sum_{i=1}^{k} \frac{(x_i(t) - c_{ij}(t))^2}{2 \times \sigma_{ij}^2}}}{\sum_{j=1}^{P} e^{-\sum_{i=1}^{k} \frac{(x_i(t) - c_{ij}(t))^2}{2 \times \sigma_{ij}^2(t)}}}, \quad (3)$$

wherein $l=1,2, \ldots, p$, $v_1$ is a first output, and $v=[v_1, v_2, \ldots, V_P]^T$ is an output vector;

and a fourth layer is an output layer, and a fitting method of the output layer uses a weighting factor method, and a calculation formula is shown in formula (4):

$$y = wv = \frac{\sum_{j=1}^{P} w_l = (t) e^{-\sum_{i=1}^{k} \frac{(x_i(t) - c_{ij}(t))^2}{2 \times \sigma_{ij}^2}}}{\sum_{j=1}^{P} e^{-\sum_{i=1}^{k} \frac{(x_i(t) - c_{ij}(t))^2}{2 \times \sigma_{ij}^2(t)}}}, \quad (4)$$

wherein $w=[W_1, W_2, \ldots, W_P]^T$ is an output weight vector, and v is an output vector of the regular layer.

3. The method for predicting and controlling a water level of a series water conveyance canal on the basis of a fuzzy neural network according to claim 1, input layer variables of the fuzzy neural network prediction model constructed in step S1 are shown in formula (5):

$$x(t)=[y(t-1), \ldots, y(t-n_y), u(t-1-t_d), \ldots, u(t-n_u-t_d)]^T \quad (5);$$

output layer variables are shown in formula (6), $$y(t)=[y(t+1), y(t+2), \ldots, y(t+H_p)]^T \quad (6),$$

wherein, $n_y$, $t_d$ and $n_u$ are input layer variables, $H_p$ is a predetermined control duration, u(t) is a sluice opening degree.

4. The method for predicting and controlling a water level of a series water conveyance canal on the basis of a fuzzy neural network according to claim 1, an objective function of the upstream water level controller constructed in step S2 is shown in formula (7):

$$J(t) = \sum_{i=1}^{H_p} (y(t+i) - \hat{y}(t+i))^T W_i^y (y(t+i) - \hat{y}(t+i)) + \sum_{j=1}^{H_u} \Delta u(t+j-1)^T W_j^u \Delta u(t+j-1), \quad (7)$$

wherein $$\Delta u(t) = u(t+1) - u(t),$$

$$|\Delta u(t)| \leq \Delta u_{max},$$

$$y_{min} \leq y(t) \leq y_{max},$$

$H_u$ a is a control duration, which meets $H_u \leq H_p$; an object y(t+i) is a predicted output variable, that is, a predicted upstream water level; $\hat{y}(t)$ is a target value of the predicted output variable, that is, an upstream target water level; u(t) is a sluice opening degree; $\Delta u(t)$ is a control variable, which is an increment of u(t), that is, a change of a sluice opening degree; and $W_i^y$ and $W_j^u$ are a weighting coefficient of i-step output variable and j-step control variable, respectively, wherein, $H_p$ is a predetermined control duration.

5. The method for predicting and controlling a water level of a series water conveyance canal on the basis of a fuzzy neural network according to claim 1, a process of the gradient optimization algorithm in step S3 comprises the following steps:

S31, minimizing an objective function of the upstream water level controller, as shown in Formula 8:

$$\hat{J}(u(t)) = \rho_1(r(t) - \hat{r}(t))^T(r(t) - \hat{r}(t)) + \rho_2 \Delta u(t)^T \Delta u(t), \quad (8)$$

wherein, $r(t) = y(t) = [y(t+1), y(t+2), \ldots, y(t+H_p)]^T,$ $\hat{r}(t) = [\hat{y}(t+1), \hat{y}(t+2), \ldots, \hat{y}(t+H_p)]^T,$ $\Delta u(t) = [u(t), u(t+1), \ldots, u(t+H_u-1)]^T,$ $$\rho_1 = \begin{bmatrix} W_1^y & & & & \\ & W_2^y & & & \\ & & \ldots & & \\ & & & W_i^y & \\ & & & & \ldots \\ & & & & & W_{H_p}^y \end{bmatrix},$$

$$\rho_2 = \begin{bmatrix} W_1^u & & & & \\ & W_2^u & & & \\ & & \ldots & & \\ & & & W_j^u & \\ & & & & \ldots \\ & & & & & W_{H_u}^u \end{bmatrix}.$$

S32, according to a gradient algorithm theory, calculating the optimal control rate of the upstream water level controller by using formula (9):

$$u(t+1) = u(t) + \Delta u(t) = u(t) + \eta_2\left(-\frac{\partial J(u(t))}{\partial u(t)}\right), \quad (9)$$

wherein $\eta_2$ is a learning rate of a control input and a partial derivative of an objective function J(u(t)) with respect to u(t) is calculated, so as to obtain $$\frac{\partial \hat{J}(u(t))}{\partial u(t)} = -\rho_1\left(\frac{\partial \hat{y}(t)}{\partial u(t)}\right)^T (r(t) - \hat{y}(t)) + \rho_2 \Delta u(t), \quad (10)$$

and therefore, $$\Delta u(t) = \frac{\eta_2 \rho_1 \left(\frac{\partial \hat{y}(t)}{\partial u(t)}\right)^T (r(t) - \hat{y}(t))}{1 + \eta_2 \rho_2}, \quad (11)$$

wherein $\partial \hat{y}(t)/\partial u(t)$ is a Jacobian matrix, which is calculated by the fuzzy neural network prediction model, wherein, $H_u$ is a control duration, which meets $H_u \leq H_p$; an object y(t+i) is a predicted output variable: $\hat{y}(t)$ is a target value of the predicted output variable; u(t) is a sluice opening degree.

* * * * *